United States Patent [19]
Gowing

[11] 4,445,294
[45] May 1, 1984

[54] FISHING LURE HAVING A PADDLE-LIKE MEMBER

[75] Inventor: James R. Gowing, Altus, Ark.

[73] Assignee: EBSCO Industries, Inc., Birmingham, Ala.

[21] Appl. No.: 417,032

[22] Filed: Sep. 13, 1982

[51] Int. Cl.³ .............................................. A01K 85/00
[52] U.S. Cl. ...................................... 43/42.47; 43/42.39
[58] Field of Search ................. 43/42.47, 42.39, 42.48, 43/42.45

[56] References Cited

U.S. PATENT DOCUMENTS

| | | | |
|---|---|---|---|
| 2,246,850 | 6/1941 | Housberg | 43/42.39 |
| 2,291,422 | 7/1942 | Thomas | 43/42.39 |
| 2,604,718 | 7/1952 | Crumb | 43/42.47 |
| 3,445,953 | 5/1969 | Dailey | 43/42.47 |
| 4,320,592 | 3/1982 | Kirsch | 43/42.39 |

FOREIGN PATENT DOCUMENTS 2409696 7/1979 France .................. 43/42.39

Primary Examiner—Gene P. Crosby
Attorney, Agent, or Firm—Woodford R. Thompson, Jr.

[57] ABSTRACT

A paddle-like member for a fishing lure embodies a flat, planar member that extends forwardly from the front end portion of the fishing lure. At least one outwardly opening cavity is provided in the front end portion of the planar member with the cavity defining a socket for receiving a weight with a friction fit. The cavity is positioned in the planar member at a location so that upon insertion of the weight into the cavity, the center of gravity of the lure is lowered. This in turn, stabilizes movement of the lure and controls the rate and angle of descent of the lure as it is pulled through the water.

5 Claims, 11 Drawing Figures

FISHING LURE HAVING A PADDLE-LIKE MEMBER

Background of the Invention

This invention relates to a fishing lure having a paddle-like member extending forwardly from its front end portion and more particularly to such a lure with improved means mounted within the paddle-like member for stabilizing movement of the lure and for controlling the rate and angle of descent of the lure as it is moved through the water.

Various attachments, such as conventional paddle-like members, have been employed on fishing lures to cause them to move deeper into the water as the lure is retrieved. Such conventional paddle-like members with which I am familiar have not been entirely satisfactory for the reasons that they make the lure somewhat unstable during retrieval and do not control the rate and angle of the descent of the lure.

Summary of the Invention

In accordance with my present invention, I overcome the above and other difficulties by providing an improved paddle-like member for a fishing lure which is simple and durable of construction and lowers the center of gravity of the lure to thus stabilize the lure during retrieval.

Another object of my invention is to provide an improved paddle-like member which causes the lure to move downwardly and also controls the rate and angle of descent of the lure each time it is pulled through the water.

My improved paddle-like member embodies a generally flat, planar member which extends forwardly and downwardly from the front end portion of the fishing lure. At least one outwardly opening cavity is provided in the front end portion of the paddle-like member with the cavity defining a socket which is of a size to receive a weight with a friction fit. The cavity is positioned in the paddle-like member at a location so that upon insertion of the weight into the cavity the center of gravity of the lure is lowered to stabilize movement of the lure during retrieval and to control the rate and angle of descent of the lure as it is pulled through the water.

Description of the Drawing

A paddle-like member embodying features of my invention is illustrated in the accompanying drawing, forming a part of this application, in which.

Detailed Description

Figure 1:
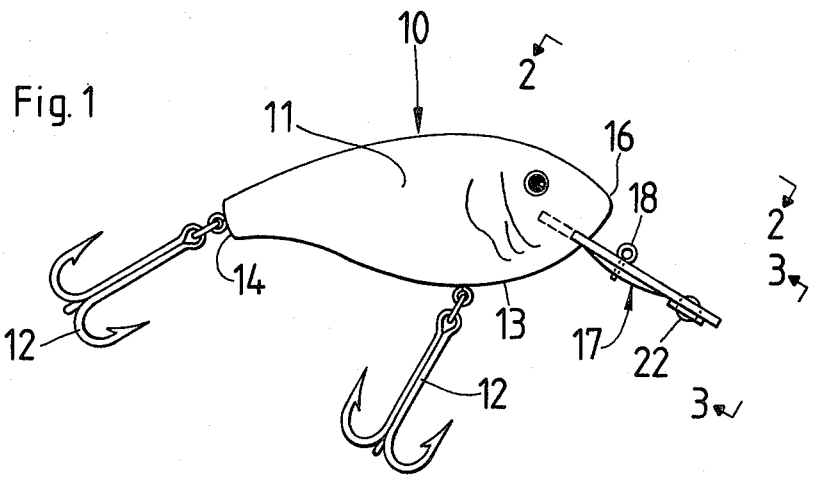
FIG. 1 is a side elevational view showing my improved paddle-like member carried by the front end portion of a fishing lure.

Referring now to the drawing for a better understanding of my invention, I show in FIG. 1 a fishing lure indicated generally at 10 and comprising a body 11 having fishing hooks 12 depending from its lower surface 13 and rear end portion 14. Extending forwardly and downwardly from the front end portion 16 of the body 11 is a generally planar, paddle-like member 17. An eyelet 18 is carried by the upper surface of the paddle-like member 17 for detachably connecting a fishing line, not shown.

Figure 2:
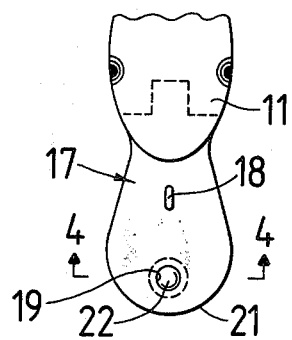
FIG. 2 is a fragmental top plan view taken generally along the line 2—2 of FIG. 1.
Figure 3:
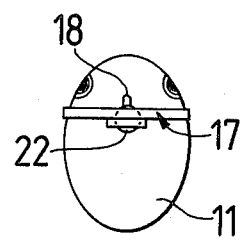
FIG. 3 is a front end view taken generally along the line 3—3 of FIG. 1.
Figure 4:
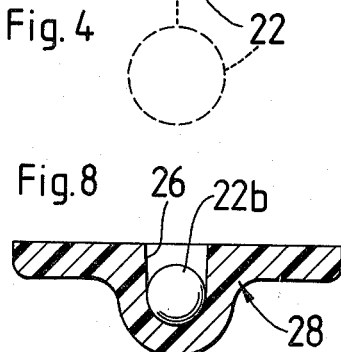
FIG. 4 is an enlarged sectional view taken generally along the line 4—4 of FIG. 2.

In the embodiment shown in FIGS. 2, 3 and 4, a transverse, downwardly opening cavity 19 is provided in the front end portion 21 of the paddle-like member 17. The cavity 19 is in the form of a socket which permits a ball-like weight 22 to be snapped therein with a friction fit, whereby the ball is retained in the cavity after insertion therein. That is, the side walls of the cavity 19 taper inwardly from the entrance or inlet 23 of the cavity toward an opening 24 at the opposite end of the cavity, as shown in FIG. 4. When the ball-like weight 22 is pushed through the inlet 23, the sides of the weight 22 engage the tapering sides of the cavity 19 with a friction fit. The weight 22 may be removed from the cavity 19 simply by pushing downwardly on the upper side of the weight which projects through the opening 24, as shown. Since the internal diameter of the opening 24 is smaller than the diameter of the weight 22, this prevents the weight from being pushed through the upper end of the cavity 19.

The cavity 19 is positioned at a location so that when the weight 22 is inserted into the cavity 19, the center of gravity of the lure body is lowered. This stabilizes movement of the lure body and controls the rate and angle of the descent of the lure body as it moves through the water.

Figure 5:
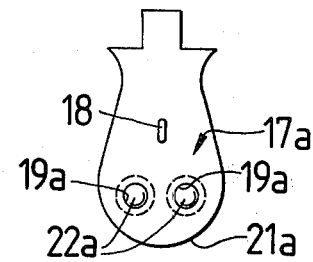
FIG. 5 is a top plan view showing a modified form of my improved paddle-like member removed from its fishing lure.

Referring now to FIG. 5, I show a modified form of my invention in which a pair of laterally spaced, downwardly opening cavities 19$^a$ are provided in the front end portion 21$^a$ of a generally planar, paddle-like member 17$^a$. The cavities 19$^a$ are identical in structure to the cavity 19. That is, each cavity 19$^a$ has side walls which taper inwardly from the inlet of the cavity toward an opening in the upper end of the cavity for receiving weights 22$^a$ of a size to snap into the cavity 19$^a$ with a friction fit. The weights 22$^a$ lower the center of gravity of the lure to stabilize the lure and control the rate and angle of descent of the lure.

While I have shown the inlets for the cavities 19 and 19$^a$ as extending through the lower surface of the paddle-like members 17 and 17$^a$, it will be apparent that the inlets of the cavities may extend through the upper surfaces of the paddle-like members to receive the ball-like weights 22 and 22$^a$, respectively.

Figure 6:
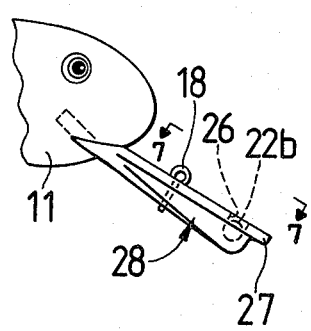
FIG. 6 is a fragmental, side elevational view showing another modified form of my improved paddle-like member.
Figure 8:
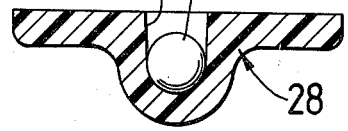
FIG. 8 is an enlarged sectional view taken generally along the line 8—8 of FIG. 7.
Figure 9:
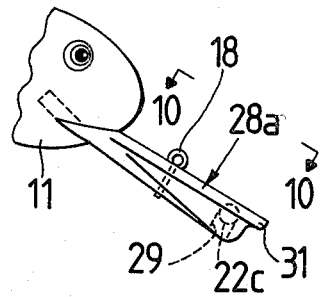
FIG. 9 is a fragmental, side elevational view showing still another modified form of my improved paddle-like member.
Figure 7:
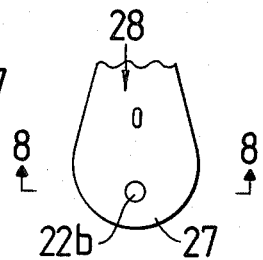
FIG. 7 is a fragmental top plan view taken generally along the line 7—7 of FIG. 6.
Figure 11:
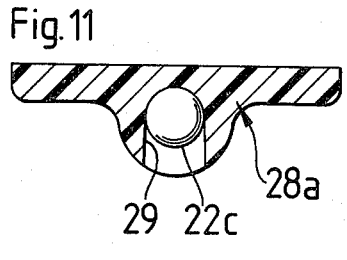
Figure 10:
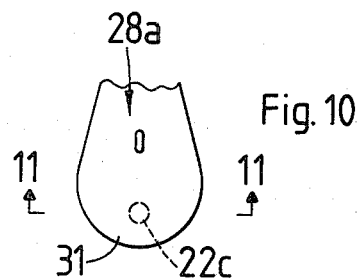
FIG. 10 is a fragmental top plan view taken generally along the line 10—10 of FIG. 9; and, FIG. 11 is an enlarged sectional view taken generally along the line 11—11 of FIG. 10.

Referring now to FIGS. 6–9, I show two additional modified forms of my invention. FIGS. 6–8 show a transverse, upwardly opening cavity 26 provided in the front end portion 27 of a generally planar, paddle-like member 28. As shown in FIG. 8, the cavity 26 is of a size to permit a ball-like weight $22^b$ of a predetermined size to pass through the inlet for the cavity 26 and engage the tapering side walls of the cavity with a friction fit. FIGS. 9–11 show a transverse downwardly opening cavity 29 provided in the front end portion 31 of a generally planar paddle-like member $28^a$. As shown in FIG. 11, the downwardly opening cavity 29 is of a size to permit a ball-like weight $22^c$ of a predetermined size to pass through the entrance or inlet of the cavity 29 and engage the tapering side walls of the cavity with a friction fit. Both cavities and 26 and 29 thus retain their respective ball-like weights in place with the amount of the weights and the location of the cavities being such that the center of gravity of each lure is lowered to stabilize the lure and control the rate and angle of descent of the lure.

From the foregoing description, the operation of my lure having an improved paddle-like member will be readily understood. The paddle-like members 17, $17^a$, 28 or $28^a$ carrying the ball-like weight, or weights are mounted at the forward end of the lure. The location and amount of the ball-like weight or weights within the paddle-like member lower the center of gravity of the lure and control the rate and angle of descent of the lure in the water.

From the foregoing, it will be seen that I have devised an improved paddle-like member for a fishing lure which is simple and durable of construction and one which causes the center of gravity of the lure to be lowered and controls the rate and angle of descent of the lure as it moves through the water.

While I have shown my invention in several forms, it will be obvious to those skilled in the art that it is not so limited, but is susceptible of various other changes and modifications without departing from the spirit thereof.

What I claim is:

1. In a fishing lure having a generally planar, paddle-like member extending forwardly from the front end portion of the body of the fishing lure, the improvement comprising,
    (a) there being at least one transverse, outwardly opening cavity in the front end portion of said paddle-like member and being generally round, as viewed in cross section,
    (b) a weight of a size to be inserted into said cavity with a friction fit, and
    (c) said cavity being positioned in said paddle-like member at a location so that upon insertion of said weight into said cavity the center of gravity of said lure is lowered to stabilize movement of the lure and control the rate and angle of descent of said lure as it moves through the water.

2. A fishing lure having a generally planar, paddle-like member as defined in claim 1 in which a pair of said cavities are provided in said front end portion of said paddle-like member in spaced relation to each other to receive a pair of said weights.

3. A fishing lure having a generally planar, paddle-like member as defined in claim 1 in which the opening of said cavity extends through the upper surface of said paddle-like member.

4. A fishing lure having a generally planar, paddle-like member as defined in claim 1 in which the opening of said cavity extends through the lower surface of said paddle-like member.

5. A fishing lure having a generally planar, paddle-like member as defined in claim 1 in which said weight is a ball-like member.

* * * * *